United States Patent [19]

Sweet, Jr.

[11] Patent Number: 4,861,435
[45] Date of Patent: Aug. 29, 1989

[54] WATER DISTILLATION APPARATUS FOR UNDER-THE-SINK OPERATION

[76] Inventor: Herbert F. Sweet, Jr., 2412 Mount Blanco Rd., Chester, Va. 23831

[21] Appl. No.: 147,750

[22] Filed: Jan. 25, 1988

[51] Int. Cl.$^4$ .............................................. B01D 3/02
[52] U.S. Cl. .................... 202/180; 202/181; 202/185.5; 202/185.6; 202/193; 202/196; 202/242; 202/269; 203/2; 203/10; 203/22; 203/27; 203/DIG. 8; 203/DIG. 9; 203/DIG. 17; 203/DIG. 18
[58] Field of Search ............ 202/176, 181, 180, 185.5, 202/185.6, 193, 196, 242, 269; 203/2, 10, 22, 27, DIG. 8, DIG. 9, DIG. 17, DIG. 18; 137/386; 49/463

[56] References Cited

U.S. PATENT DOCUMENTS

| | | | |
|---|---|---|---|
| 1,246,146 | 11/1917 | Noble | 202/185.5 |
| 1,284,406 | 11/1918 | Martens | 202/166 |
| 2,079,897 | 5/1937 | Brown | 202/203 |
| 3,055,810 | 9/1962 | Skow | 202/71 |
| 3,582,473 | 6/1971 | Burnstead | 202/189 |
| 3,696,003 | 10/1972 | Fitch et al. | 202/167 |
| 3,860,494 | 1/1975 | Hickman | 202/167 |
| 3,935,077 | 1/1976 | Dennison | 203/1 |
| 3,975,241 | 8/1976 | Smith | 202/202 |
| 3,980,526 | 9/1976 | Kirschmann | 202/83 |
| 4,035,240 | 7/1977 | McLean | 202/167 |
| 4,252,616 | 2/1981 | Glazer | 203/10 |
| 4,339,307 | 7/1982 | Ellis, Jr. | 202/176 |
| 4,622,102 | 11/1986 | Diebel | 203/1 |
| 4,687,550 | 8/1987 | Wong | 202/165 |

OTHER PUBLICATIONS

Durastill Brochure, undated, 2 pages.
Polar Bear Water Distillers Brochure, undated, 4 pages.
Springtime Automatic Water Distillers Brochure, undated, 6 pages.
Hague Hydro-Clean Distiller Brochure, undated, 4 pages.
Newater Portable Water Distiller Brochure, undated, 2 pages.
Distil-Clear Pure Water System Brochure, undated, 2 pages.
Waterwise Inc. Brochure, undated, 4 pages.
Dol-Fyn Water Distiller Brochure, undated, 2 pages.

*Primary Examiner*—Virginia Manoharan
*Attorney, Agent, or Firm*—John R. Flanagan

[57] ABSTRACT

A water distillation apparatus having a distilled water storage tank and a water boiling tank. Components associated with the boiling tank control the level of water therein and production of steam from the water contained therein. A steam flow line permits steam flow from the boiling tank into the storage tank. A distilled water cooling coil disposed in the storage tank at a lower region below the distilled water level is connected with a cool water infeed flow line. A steam condensing coil disposed in the storage tank at an upper region thereof above the desired water level and the cooling coil is connected with the cooling coil. Steam which enters the storage tank can directly contact the condensing coil exterior surface for causing the steam to condense into distilled water in the storage tank. Another water flow line which connects the condensing coil to both the boiling tank and a sink drain line has a flow restrictor therein to ensure maintenance of sufficient head pressure to force flow of water to the boiling tank before discharge into the drain line. Delivery of pressurized cool water to the cooling coil is controlled by a solenoid-operated water flow control valve and a thermostat. The thermostat mounted on the tank is operable to sense tank temperature and to actuate the water flow control valve for either allowing or terminating routing of cool water to the cooling coil depending upon the level of the temperature sensed.

8 Claims, 3 Drawing Sheets

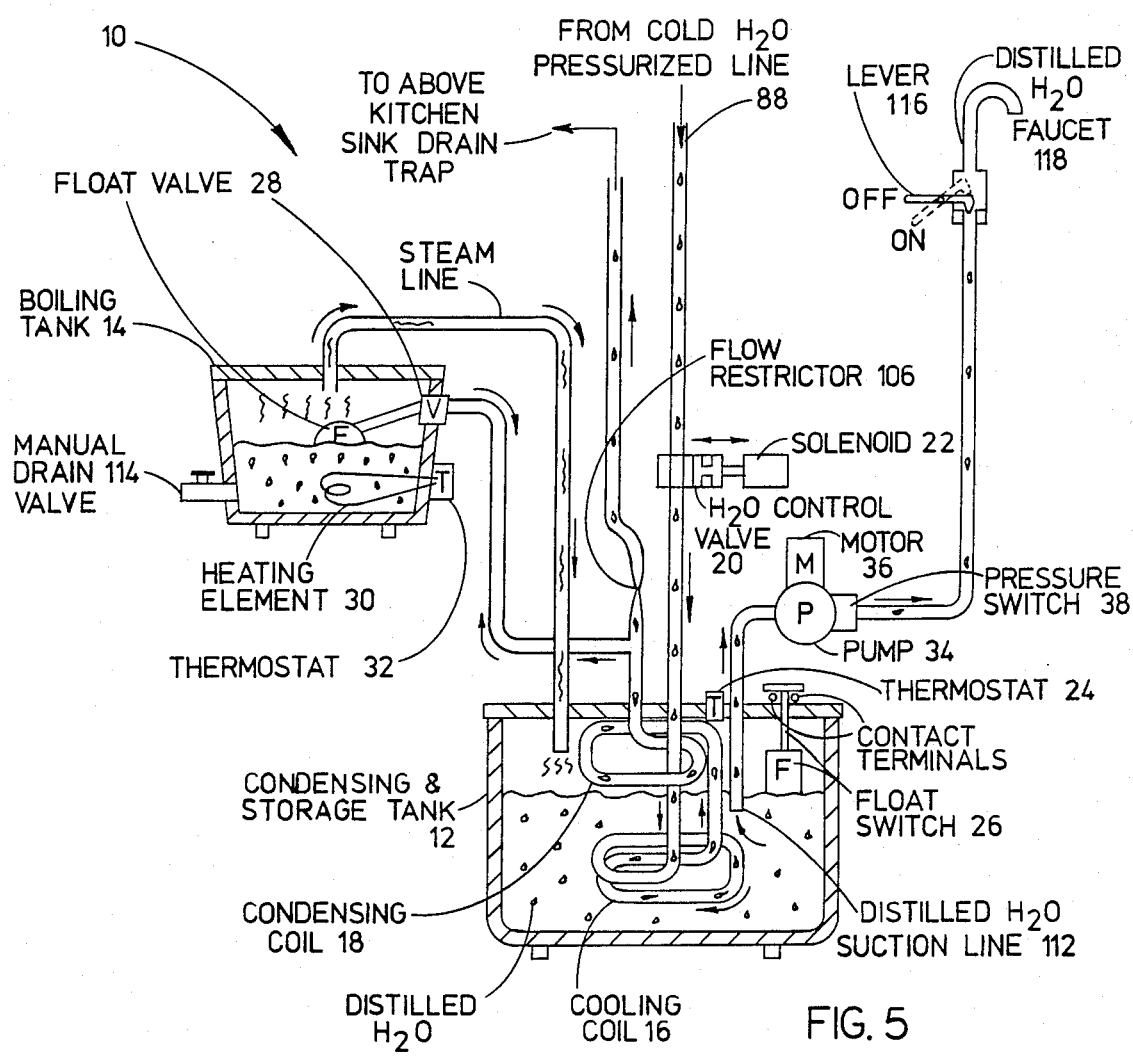
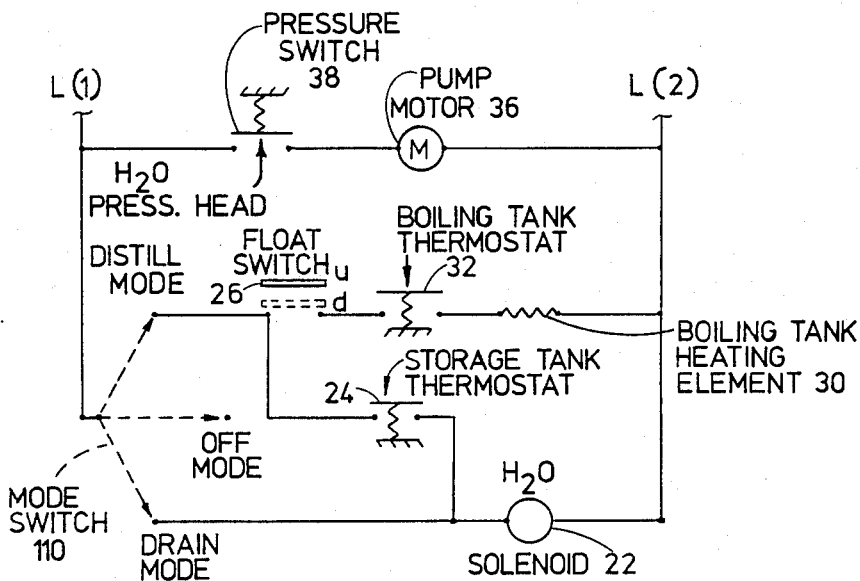
FIG. 6

WATER DISTILLATION APPARATUS FOR UNDER-THE-SINK OPERATION

BACKGROUND OF THE INVENTION

1. Field of the Invention

The present invention generally relates to water purification and, more particularly, is concerned with a water distillation apparatus being capable of under-the-sink operation.

Description of the Prior Art

There is much evidence from government and independent studies showing that ordinary household drinking water contains elements and chemicals that are harmful to public health. Scientists from the World Health Organization and the National Cancer Institute estimate that up to 80% of all cancer is caused by chemicals in the air people breathe, the food they eat and the water they drink.

Distillation has proven to be one of the most simple, economical and effective ways to remove harmful pollutants in water ranging from bacteria and viruses to radioactivity. Basically, distillation involves boiling water, capturing and condensing the steam generated from the boiling process, and then collecting the condensed steam as pure water.

Distillation apparatuses have been available for many years, particularly for providing improved quality of water, such as water for cooking and drinking. Many apparatuses having various arrangements of tanks, heaters, coils, valves, pumps, etc., for accomplishing water distillation appear in the prior patent art and the commercial literature. Representative of the prior art are the apparatuses disclosed in U.S. Pat. Nos. to Martens (1,284,406), Skow (3,055,810), Fitch et al (3,696,003), Hickman (3,860,494), Smith (3,975,241), Kirschmann (3,980,526), McLean (4,035,240), Glazer (4,252,616), Ellis, Jr. (4,339,307) and Wong (4,687,550).

For carrying out distillation of household water to provide pure water for use in cooking and drinking, the optimum location of the apparatus is under the kitchen sink. However, the confined and closed condition of such location makes effective cooling of the apparatus a problem. Inadequate access to a source of cool air means that cooling the apparatus by circulation of air is not feasible. Use of cooling water from a pressurized cold tap water line would appear to hold the most promise as a viable way to cool the distillation apparatus and condense steam into pure water.

However, none of the water-cooled distillation apparatuses either disclosed in the prior patent art or being sold commercially is optimally adapted for use under a sink. Those distillation apparatuses that might be capable of fitting under the sink disadvantageously employ a gravity flow to dispose of used or "spent" cooling tap water. However, when placed under the sink, the distillation apparatus will be located below the level of the top of the trap in the sink drain line which is the only realistic means available to effectively get rid of the spent cooling water. Thus, gravity flow would be inadequate to move spent cooling water from the apparatus upwardly above the drain trap for discharge into the sink drain line.

Therefore, a long-felt need is perceived to exist for a distillation apparatus particularly adapted for use under a sink (but, of course, not just limited to use in such location), whether the sink be in a household kitchen or in any other facility. The apparatus should be capable of functioning automatically (that is, without the requirement for frequent human monitoring, control or intervention) in using pressurized tap water as the cooling medium and then discharging the spent cooling water to the sink drain line. The need for such apparatus has remained unfulfilled up to the present time.

SUMMARY OF THE INVENTION

The present invention provides a water distillation apparatus designed to satisfy the aforementioned needs. The distillation apparatus of the present invention incorporates many features which provide benefits and advantages not recognized nor enjoyed heretofore.

One feature incorporated by the distillation apparatus of the present invention relates to provision of a cooling coil submersed in distilled water contained in a storage tank of the apparatus through which is routed the pressurized cool tap water. None of the distillation apparatuses of the cited prior art have such feature. Instead, the prior art apparatus of the aforecited Skow patent shows a refrigerant expansion element mounted near the bottom of the distilled water storage tank of that apparatus.

Another feature of the apparatus of the present invention relates to provision of a condensing coil above the level of distilled water contained in the storage tank and connected in flow communication with and downsteam of the submersed cooling coil for routing of pressurized cool tap water therethrough after leaving the cooling coil and with the condensing coil being surrounded on its exterior surface by and in direct contact with steam flowing into the storage tank from a water boiling tank of the apparatus. Again, the cited prior art apparatuses do not disclose this feature. Instead, the distillation apparatus of the aforecited Martens patent discloses a cooling coil disposed above the level of distilled water in the condensed water receiving tank and in intimate relationship with a vapor coil which receives steam from a vaporizing tank and within which coil the steam is condensed into distilled water before leaving the coil and dripping into the condensed water receiving tank. Cooling water from the main cold water line is routed through the cooling coil of Martens. Exchange of heat in Martens for condensing of vapor in the vapor coil takes place between the vapor coil and cooling coil and not directly between the steam and a condensing coil through which the cooling water is routed as in the apparatus of the present invention.

Still another feature in the apparatus of the present invention relates to provision of a cooling tap water flow arrangement located downstream of the storage tank which has an upstream main line connected in flow communication to and running downstream from the condensing coil in the storage tank and a pair of downstream branch lines connected in flow communication to and running downstream from the upstream main line to a float valve in the water boiling tank of the apparatus and to a discharge point located above a drain line trap. A flow restrictor is interposed in the one downstream branch line connected to the drain line so as to ensure sufficient head pressure in that line to force flow of water to the boiling tank. The prior art apparatuses fail to show this feature. Instead, the Martens patent discloses a cold water flow arrangement located downstream of the condensed water receiving tank which has a main section connected in flow communication with the upstream cooling coil in the top of the distilled water receiving tank and running downstream therefrom to a destination not disclosed and a branch section connected in flow communication between the main section and a float valve in the vapor tank. There is no flow restrictor interposed in the main section of the cold water flow arrangement of the Martens patent downstream of the branch section; therefore, it is doubtful that water would be forced to flow through the branch section into the vapor tank against the pressure head of water already therein.

Yet another feature incorporated by the apparatus of the present invention relates to the provision of a temperature sensing element, such as a thermostat, mounted on the storage tank and extending therein and a flow control valve in the pressurized cold tap water line upstream of the storage tank cooling coil which is actuated to either allow or terminate inflow of cool tap water to the storage tank cooling and condensing coils in response to the temperature of the storage tank sensed by the temperature sensing element. Here again, the prior art apparatuses do not suggest this feature. Instead, in the Skow patent a thermostat in the storage tank controls operation of the refrigerating unit therein, whereas in the Ellis, Jr. and Wong patents a thermostatic valve is employed to open a drain line for draining heated undistilled line water from the condensing tank and replenishing it with cold raw water in response to an increase of water temperature in the tank above a predetermined level.

Additional features are incorporated by the distillation apparatus of the present invention which are not taught in the cited prior art. First, two different mounting locations for the thermostat on the storage tank are provided. At one location, the thermostat is disposed adjacent to the condensing coil which will cause periodic cooling of the thermostat sufficient to actuate the control valve to shutoff the infeed of cool water. Thus, only intermittent cycling of cool tap water inflow to the coils of the storage tank takes place which results in the storage tank being at a higher average temperature than if the thermostat is at the other location. At the other location, the thermostat is disposed more remote from the condensing coil and thus not cooled sufficiently by the coil to actuate the control valve to shutoff the infeed of cool water. This results in continuous inflow of cool tap water and maintenance of the storage tank at a lower average temperature.

Next, in addition to an "off" of mode, two operating "on" modes are provided for the distillation apparatus. In one "on" mode, the apparatus is operable to automatically distill water as it is needed to replenish the supply in the storage tank. In the other mode, the apparatus is operable to either initiate startup filling or to drain and flush the water boiling tank. Finally, the construction of the storage and boiling tanks of the apparatus and the arrangements employed for attaching and sealing the covers to the respective tank bodies thereof are unique.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 5 is a diagrammatic view of the distillation apparatus for illustrating the flow paths of water and steam in the operation of the apparatus.

FIG. 6 is a diagrammatic view of the electrical components of the distillation apparatus and the connections therebetween.

DETAILED DESCRIPTION OF THE INVENTION

Figure 1:
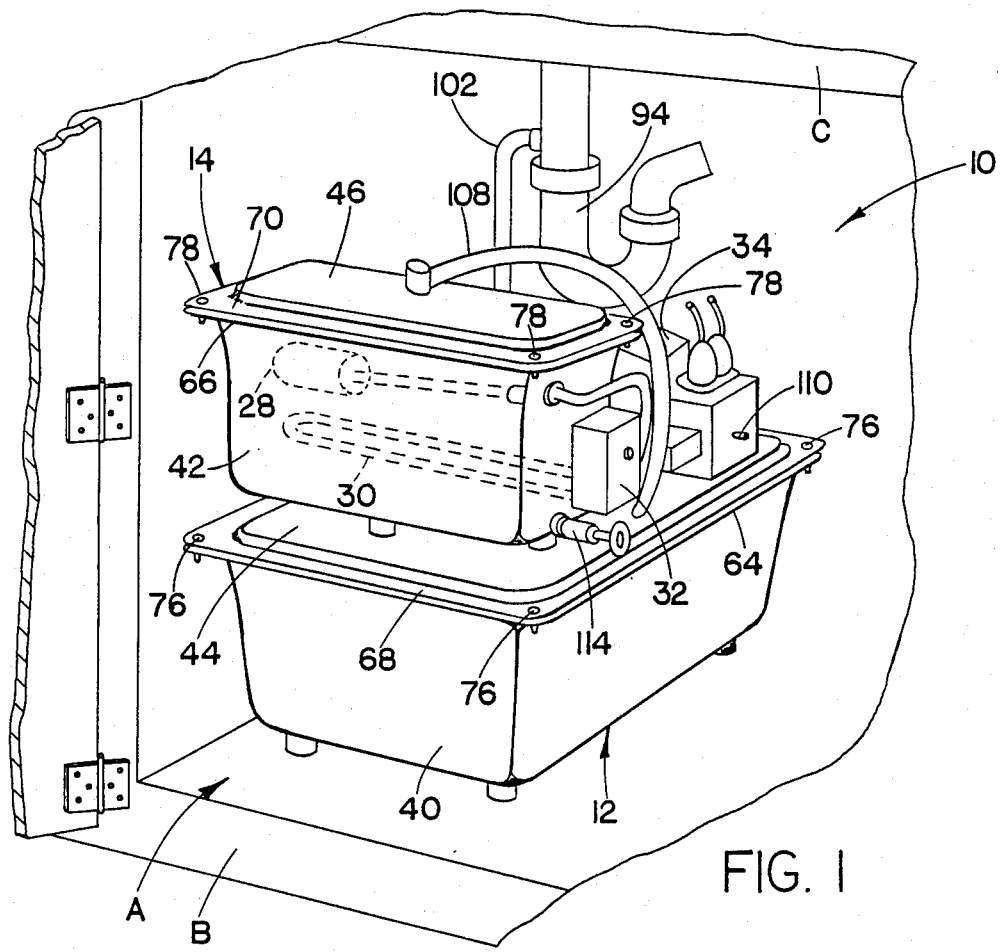
FIG. 1 is a perspective view of the water distillation apparatus of the present invention installed in a cabinet below a kitchen sink.

In the following description, like reference characters designate like or corresponding parts throughout the several views of the drawings. Also in the following description, it is to be understood that such terms as "forward", "left", "upwardly," etc., are words of convenience and are not to be construed as limiting terms.

Figure 2:
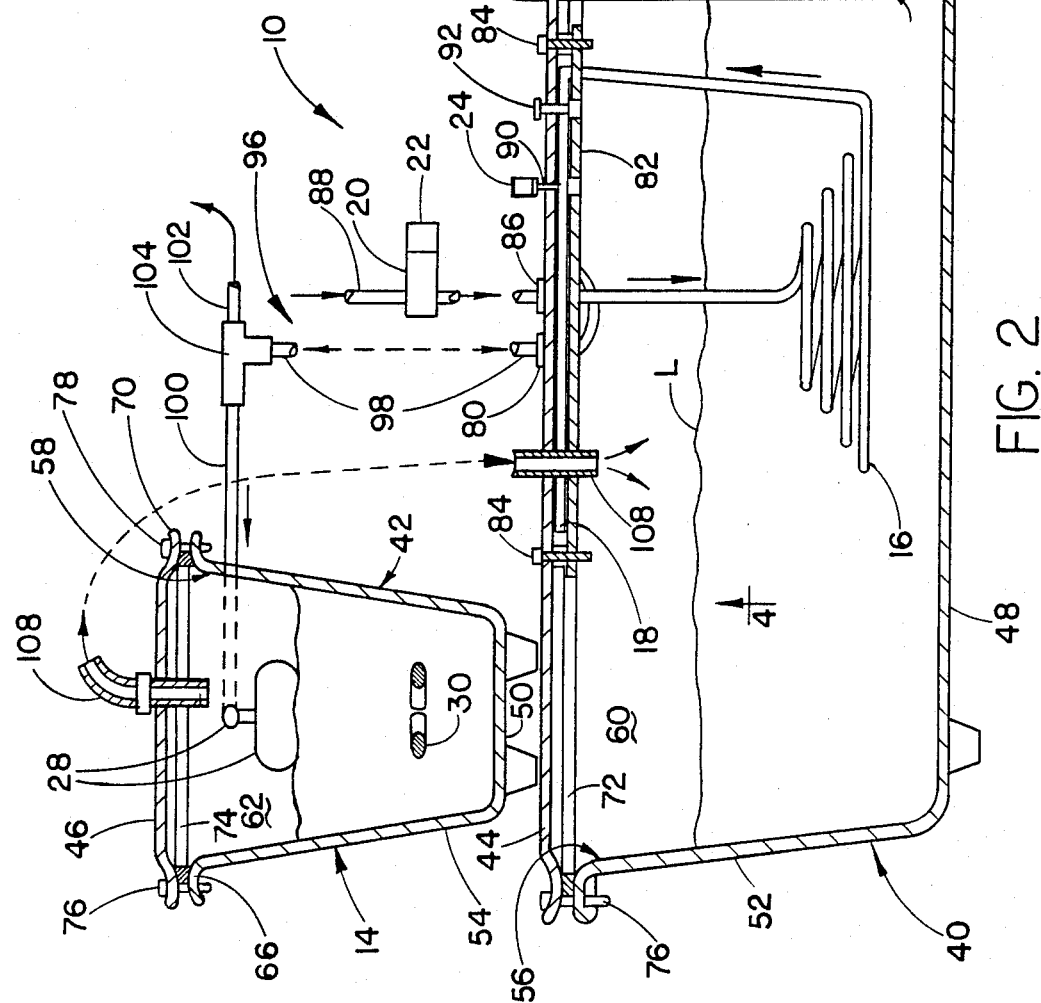
FIG. 2 is an enlarged side elevational view, partly in section, of the distillation apparatus of FIG. 1.

Referring now to the drawings, and particularly to FIGS. 1-2, there is shown the preferred embodiment of a water distillation apparatus, generally designated by the numeral 10 and constructed in accordance with the principles of the present invention. The distillation apparatus 10 is illustrated in FIG. 1 installed at its preferred location, such being within a compartment A of a cabinet B under a kitchen sink C. The distillation apparatus 10 basically includes a condensing and distilled water storage tank 12, a water boiling tank 14, a distilled water cooling line or coil 16, a steam condensing line or coil 18, a cool tap water infeed flow control valve 20 operated by a solenoid 22, a storage tank-mounted thermostat 24, a storage tank-mounted float switch 26, a boiling tank-mounted float valve 28, a boiling tank-mounted heating element 30 controlled by a thermostat 32, and a distilled water pump 34 operated by a motor 36 controlled by a pressure switch 38.

Figure 3:
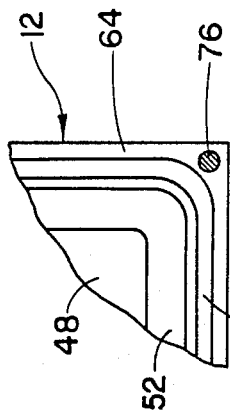
FIG. 3 is an enlarged fragmentary top plan view as seen along line 3—3 of FIG. 2, illustrating the location of a sealing gasket on the rim of the body of the condensing and storage tank relative to the location of a fastener for attaching the tank cover to the body.

Referring now to FIGS. 2 and 3, the storage and boiling tanks 12, 14 are of substantially the same constructions with the storage tank being several times larger in water holding capacity than the boiling tank. Each tank 12, 14 includes a generally rectangular-shaped body 40, 42 and a generally flat cover 44, 46 releasably and sealably attachable on the body. Each tank body 40, 42 is formed by a bottom 48, 50 and four sides 52, 54 which flare slightly outwardly from the bottom 48, 50 to a top opening 56, 58 so as to define a cavity 60, 62 adapted to hold water. Further, each tank body 40, 42 has a continuous annular to rim 64, 66 formed about the top periphery thereof and encompassing the top opening 56, 58 of the body cavity 60, 62. The cover 44, 46 of each tank 12, 14 is adapted to overlie and close the top opening 56, 58 of the body cavity 60, 62 and has an annular outer rim 68, 70 formed about the periphery thereof and being adapted to overlie the annular top rim 64, 66 of the tank body 40, 42.

Also, each tank 12, 14 includes means for removably and sealably attaching the cover 44, 46 at its outer rim 68, 70 on the tank body 40, 42 at its top rim 64, 66. The attaching means includes a yieldably resilient continuous band-shaped sealing element or gasket 72, 74 and plurality of detachable fastening elements 76, 78 associated with each tank body 40, 42 and cover 44, 46. The sealing gasket 72, 74 is disposed between the top rim 64, 66 of the body 40, 42 and the outer rim 68, 70 of the cover 44, 46. The detachable or releasable fastening elements 76, 78, such as conventional metal screws, are attachable to the rims 64, 66 and 68, 70 of the body 40, 42 and cover 44, 46 for imposing a clamping force thereon that draws the rims toward one another and compresses the sealing gasket 72, 74 between the rims. As seen specifically in FIG. 3 with respect to the storage tank 12 the sealing gasket 72, 74 is disposed at inner peripheral portions of the respective rims 64, 66 and 68, 70 and the fastening elements 76, 78 are attached at spaced apart locations, preferably at each of the four corners, at outer peripheral portions of the respective rims.

Figure 4:
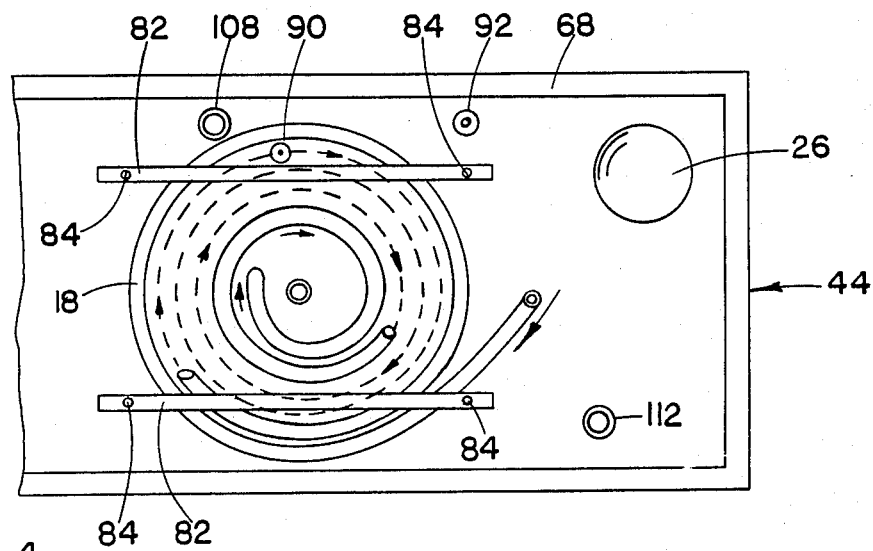
FIG. 4 is a fragmentary bottom plan view on a smaller scale as seen along line 4—4 of FIG. 2, illustrating the condensing coil mounted to the bottom side of the cover of a condensing and storage tank of the distillation apparatus.

Turning now to FIGS. 2 and 4, it can be seen that the storage tank 12 has the hollow tubular steam condensing coil 18 attached at one end by a coupler 80 to the storage tank cover 44 and in flow communication at the exterior of the tank 12. The condensing coil 18 is disposed in the cavity 60 of the storage tank body 40 at an upper region thereof above a desired level L of distilled water therein when the cover 44 is disposed on the body 40. A pair of elongated laterally spaced apart rails 82 attached by fasteners 84 to the storage tank cover 44 mount the steam condensing coil 18 in a generally flat configuration to the underside of the tank cover 44.

The storage tank 12 also has the hollow tubular distilled water cooling coil 16 disposed in the cavity 60 of the storage tank body 40 at a lower region thereof below the condensing coil 18 and the desired distilled water level L. One end of the cooling coil 16 is connected in flow communication with the other end of the condensing coil 18, whereas the other end of the cooling coil 16 is attached by a coupler 86 to the storage tank cover 44 and in flow communication at the exterior of the storage tank 12. Thus, the cooling and condensing coils 16, 18 are both disposed in the storage tank body cavity 60 solely by their respective attachments to the tank cover 44 such that upon removal of the cover 44 from the tank body 40 the coils 16, 18 are removed therewith from the body cavity 60. The advantages of this feature in facilitating the cleaning of the tank are readily apparent.

A cool tap water infeed flow line 88 is provided above the storage tank 12 for carrying pressurized cool water to the storage tank. The other end of the cooling coil 16 at the exterior of and above the storage tank cover 40 is connected in flow communication with the cool water infeed flow line 88. The direction of inflow of cool water is such that the cooling coil 16 disposed in the lower region of the storage tank cavity 60 is located downstream of the cool water flow line 88 and the condensing coil disposed in the upper region of the storage tank cavity 60 is located downstream of the lower cooling coil 16.

For controlling the delivery of pressurized cool water from the upstream cool water infeed flow line 88 to the cooling coil 16 in the lower region of the storage tank cavity 60, the above-noted water flow control valve 20, the solenoid 22 and the temperature responsive device in the form of the thermostat 24 of the apparatus 10 are provided. The water flow control valve 20 is located above the storage tank cover 44, interposed in the cool water infeed flow line 88 in flow communication with the flow line 88 and thereby with the cooling coil 16. The control valve 20 is moved between open and closed by the electrical solenoid 22 for either allowing or terminating the flow of pressurized cool water to the cooling coil 16 depending on the temperature level sensed by the thermostat 24. The solenoid 22 is mounted to the control valve 20 and actuatable by the thermostat 24 mounted on the storage tank cover 44 and extending into the storage tank 12. The thermostat 24 is operable to sense the temperature of the storage tank 12 at the cover location where the thermostat 24 is mounted on the tank 12. The thermostat 24 is adapted to activate the solenoid 22 at a preset maximum temperature within a predetermined temperature range to actuate the water flow control valve 20 for allowing passage of cool water therethrough and to deactivate the solenoid 22 at a preset minimum temperature to actuate the control valve 20 for terminating passage of cool water.

For providing periodic cooling of the apparatus 10 by allowing intermittent flow of the cool tap water into the storage tank coils 16, 18, the thermostat 24 is mounted to a first connector 90 attached to the storage tank cover 44 at a first location adjacent to the condensing coil 18. At the first location on the tank cover 44, the thermostat 24 is capable of being cooled to the minimum preset temperature each time cool water is routed through the condensing coil 18 so as to cause actuation of the cool water control valve 20 via the solenoid 22 to terminate routing of cool water to the cooling coil 16.

Alternatively, to allow continuous routing of cool water to the cooling coil 16 and somewhat cooler operation of the apparatus 10 than when the thermostat 24 is mounted to the first connector 90, a second connector 92 is provided, being attached to the storage tank cover 44 at a second location spaced more remote from the condensing coil 18. When the thermostat 24 is mounted to the second connector 92 at the second, remote location on the tank cover 44, it is incapable of being cooled down to the minimum preset temperature until the source heating it, i.e., the flow of steam into the storage tank 12, is cutoff. This occurs when the level of distilled water in the storage tank 12 has moved the float switch 26 to its "up" or "U" position. Thus, until steam production terminates in the boiling tank 14, the thermostat 24 is incapable of activating the solenoid 22 to actuate the control valve 20 to terminate routing of cool water to the cooling coil 16.

For routing the cool water after passage through the storage tank cooling and condensing coils 16, 18 to the boiling tank 14 and to a discharge point at a drain line above a drain trap 94, a water flow line arrangement, generally identified by the numeral 96, is located between the boiling tank 14 and the storage tank 12. The water flow line arrangement 96 has a main upstream line 98 connected in flow communication with and running downstream of the condensing coil 18, and a pair of downstream branch lines 100, 102 connected in flow communication by a T-connector 104 with and running downstream from the main upstream line 96. The branch lines 100, 102 are also respectively connected in flow communication with the boiling tank 14 and the discharge point located above the drain trap 94 and the storage tank 12. Also, a flow restrictor 106 is located downstream of the T-connector 104, being interposed in the one branch line 102 connected to the drain trap 94 so as to ensure sufficient head pressure in the one branch line 102 to force flow of water through the other branch line 100 to the boiling tank 14 so long as the float valve 28 permits the same. Another important function of the flow restrictor 106 is to slow down the velocity of cool water flow through the coils 16, 18 and lines 98, 100 in order to enhance the ability of the cool water to absorb heat during its travel through the coils in the storage tank.

The float valve 28, heating element 30 and thermostat 32 are disposed in the boiling tank 14 and operable for controlling the level of water therein and for producing steam from the water contained therein. Also, a steam flow line 108 is located between the boiling and storage tanks 14, 12 and connects the boiling tank 14 in flow communication with and upstream of the storage tank 12 for permitting the flow of steam from the boiling tank into the storage tank. The steam enters the storage tank 12 via the steam flow line 108 adjacent the condensing coil 18. The steam fills the upper region of the storage tank cavity 60 and directly contacts the exterior surface of the condensing coil 18 and upper surface of the distilled water in the tank. Such direct contact enhances the efficiency of heat transfer, causing condensation of the steam into distilled water in the storage tank 12.

Referring now to FIGS. 5 and 6, the operation of the apparatus 10 will be described with reference to each of its three modes which are controlled by the position of a mode switch 110. One of the modes is a non-operating condition or "off" mode. The other two modes are operating conditions, one being a "drain" mode and the other being a "distill" mode. As seen in FIG. 6, electrical power is provided between AC supply lines L(1) and L(2) to the pump motor 36 for running the pump 34 regardless of the position of the mode switch 110.

In the "off" mode, the mode switch 110 is in the center position as seen in FIG. 6, wherein such position no electrical power is supplied to the heating element 30 for generating steam nor to the solenoid 22 for operating the water flow control valve 20. Thus, steam cannot be generated in the boiling tank 14, and cool line or tap water cannot be fed via the flow control valve 20 to the cooling and condensing coils 16, 18 nor to the boiling tank 14. Thus, in the "off" mode, the apparatus 10 is inactivated, although the pump 34 can still be operated by depressing a lever of the faucet for pumping distilled water from the storage tank 12 through a distilled water delivery line 112.

In the "drain" mode, the mode switch 110 is in the lower position as seen in FIG. 6, wherein such position electrical power is supplied directly to the solenoid 22, bypassing the storage tank thermostat 24, causing the water flow control valve 20 to be opened. The "drain" mode can serve one of three different functions: first, for startup filling of the boiling tank 14; second, for flushing and draining of the boiling tank; or, third, for cooling the storage tank 12 by merely routing cool water through the coils 16, 18 to the discharge point at the drain line above the drain trap 94. A drain valve 114 on the boiling tank 14 must also be opened for the latter function to be performed during the "drain" mode of the apparatus 10. Irrespective of which function is being performed, in the "drain" mode cool water flows under pressure from the cool water infeed flow line 88 successively through the water flow control valve 20, the cooling coil 16, the condensing coil 18 and therefrom through the float valve 28 into the boiling tank 14 (until the proper water level is reached) and through the flow restrictor 106 into the drain line.

In the "distill" mode, the mode switch 110 is in the upper position as seen in FIG. 6, wherein such position of the switch 110 the position of the storage tank float switch 26 and the temperature of the boiling tank thermostat 32 determine whether or not electrical power is supplied to the boiling tank heating element 30. Also, in such position of the mode switch 110, the temperature of the storage tank thermostat 24 determines whether or not electrical power is supplied to the solenoid 22.

More particularly, when the storage tank float switch 26 is in its "down" or "D" position, meaning the level of distilled water is low in the storage tank 12, the boiling tank heating element 30 is supplied with electrical power via its thermostat 32 so long as the temperature sensed by the thermostat is below a preset level, such as 220° degrees F. If the temperature rises above the preset level (such as would occur if the water level in the boiling tank 14 is too low), then the thermostat 32 will turn off the heating element 30 and keep the heating element off until the temperature drops to a lower preset level, such as 100 degrees F. When electrical power is supplied to the heating element 30, it gets hot and produces steam in the boiling tank. As the steam is produced, it flows via the steam flow line from the upper region of the boiling tank 14 and into the upper region of the storage tank 12 where it is condensed via exchange of heat with the exterior surface of the cooler condensing coil 18 and top surface of the already distilled water in the storage tank 12.

However, the injection of the steam and condensation thereof to distilled water in the upper region of the storage tank 12 causes the cover 44 of the storage tank to rise in temperature. When the temperature of the storage tank cover 44 reaches the maximum or upper preset limit, such as 160° degrees F, the storage tank thermostat 24 closes and supplies electrical power to actuate the solenoid 22 to open the cool water flow control valve 20. This causes cool water to be fed, first, through the lower cooling coil 16 (cooling the storage tank 12 and distilled water therein), next, through the upper condensing coil 18 (cooling it and the storage tank cover , then, through the boiling tank float valve 28 (replenishing the water in the boiling tank 14 used in the production of steam) and, more or less concurrently, through the flow restrictor 106 (discharging the hot gases into the drain line).

The pressurized cool water continues to flow through the water flow control valve 20, the coils 16, 18, the boiling tank float valve 28 (until the proper water level is reached) and the flow restrictor 106 until the temperature at the storage tank thermostat 24 on the tank cover 44 drops to the minimum or lower preset limit, such as 120 degrees F. At that temperature, the storage tank thermostat 24 opens, deactuating the solenoid 22 to close the flow control valve 20. However, steam continuing to flow from the boiling tank 14 into the storage tank 12 again begins to raise the temperature of the tank cover 44 and the same cycle is repeated. The frequency of the cycle is determined by the pressure and temperature of the pressurized cool line water supplied to the apparatus 10. The average cycle is: water "on" for one minute; and water "off" for five minutes. The apparatus 10 continues to produce steam and distilled water in this manner until the storage tank float switch 26 rises to its "up" or "u" position, breaking electrical contact and terminating the supply of electrical power to the boiling tank heating element 30 via its thermostat 32.

When a lever 116 of a faucet 118 is depressed, distilled water will flow from the faucet spout. Depression of the lever 116 decreases the pressure head on the pump 34 and closes a pressure switch 38 on the pump, which activates the pump motor 36 to run the pump. Water is then pumped from the storage tank 12 through the distilled water delivery suction line 112 and routed through an air accumulator and post filter arrangement (not shown) to the faucet 118. When the lever 116 is released, the pressure head on the pump 34 is increased and the pressure switch 38 opens to deactivate the pump motor 36, turning off the pump. When enough distilled water is withdrawn from the storage tank 12 to lower the float switch 26 to its "D" position, electrical power is again supplied to the boiling tank heating element 30, and steam and then distilled water will again be produced.

It should be noted that water is only available to replenish the boiling tank 14 during the "distill" mode of operation of the apparatus 10 when cool water is being circulated through the coils 16, 18 to reduce the temperature of the storage tank 12 and distilled water in the tank. This circulated water will increase in temperature as the temperature of the storage tank is reduced from 160° to 120° degrees F. Thus, the water routed to the boiling tank 14 is in a preheated condition at a temperature substantially above the normal temperature of ordinary cool line or tap water.

It should be realized that the flow control valve 20 and its solenoid 22, the water pump 34 and its motor 36 and pressure switch 38, and the mode switch 110 are all mounted to the storage tank cover 44 along with the cooling and condensing coils 16, 18. So all components of the apparatus 10 associated with its storage tank 12 are removed with its cover 44. As seen in FIGS. 1 and 2, sufficient space is available on the cover 44 upon which to place the boiling tank 14.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A water distillation apparatus, comprising in combination:
   (a) means for generating pressurized steam including a boiling tank;
   (b) means for condensing the pressurized steam into distilled water and for cooling the distilled water, said condensing and cooling means including
      (i) a storage tank having an upper region in which steam is condensed and a lower region in which distilled water is collected and stored,
      (ii) a cooling coil disposed in said storage tank at said lower region thereof below a desired level of distilled water stored therein, said cooling coil having a portion extending through said storage tank to the exterior thereof for connecting at the exterior of said storage tank and in flow communication with a source of pressurized feed water for receiving the same therethrough and causing cooling of the distilled water stored in said lower region of said tank in a heat exchange relationship with said cooling coil, and
      (iii) a condensing coil disposed in said storage tank at said upper region thereof above the desired level of distilled water stored therein where the exterior surface of said condensing coil is contacted directly in a heat exchange relationship by steam located within said storage tank, said condensing coil connected in flow communication with and located above said cooling coil for receiving the feed water therefrom, said condensing coil also having a portion extending through said storage tank to the exterior of said storage tank for routing the feed water from said storage tank after passage through said cooling and condensing coils;
   (c) means for supplying pressurized steam to said storage tank and means for supplying feed water to said boiling tank, said means for supplying pressurized steam to said storage tank including
      a steam flow line located between said boiling tank and said storage tank and connecting said boiling tank in flow communication with said storage tank for permitting the flow of pressurized steam from said boiling tank into said storage tank, and said means for supplying feed water to said boiling tank including
      (i) a water flow conduit means located between said boiling tank and said storage tank and having a main branch connected in flow communication with said condensing coil and a pair of secondary branches connected in flow communication with said main branch one of the pair connected to said boiling tank and the other of the pair to a drain line located above said storage tank, and
      (ii) a flow restrictor interposed in the other of the pair of said secondary branches connected to the drain line so as to insure that there is sufficient head pressure to force the flow of water to said boiling tank.

2. The apparatus as recited in claim 1, wherein said storage tank includes:
   a tank body for holding the distilled water contained in said tank and being open at its top;
   a cover disposed in overlying relationship and removably and sealably attached to said open top of said tank body to close the same; and
   means on said cover for attaching said cooling and condensing coils to said cover at said portions of said coils which extend through said tank to the exterior thereof so that said coils are supported within said tank body solely by said attaching means on said cover.

3. A water distillation apparatus, comprising in combination:
   (a) means for generating and supplying pressurized steam;
   (b) means for condensing the pressurized steam into distilled water and for cooling the distilled water, said condensing and cooling means including
      (i) a storage tank for storing a desired level of distilled water therein and in which steam is condensed above said distilled water level,
      (ii) means for connecting said pressurized steam generating and supplying means in flow communication with said storage tank at an upper region thereof for permitting flow of pressurized steam into said storage tank, (iii) a condensing coil disposed in said storage tank above the desired level of distilled water stored therein and for direct contact at its exterior surface in a heat exchange relationship with steam in said tank above the distilled water level, and (iv) a cooling coil disposed in said storage tank below the desired level of distilled water stored therein and below said condensing coil, said cooling coil for receiving pressurized feed water and causing cooling of the distilled water stored in said storage tank in a heat exchange contacting relationship with said cooling coil, said condensing coil connected in flow communication with said cooling coil for receiving pressurized feed water therefrom, causing condensing of the steam into distilled water and routing the feed water to the exterior of said storage tank;

(c) means for controlling delivery of pressurized feed water from a source thereof to said cooling coil; and (d) a temperature sensing element mounted on said tank and extending therein for sensing the temperature of said tank at the location where said sensing element is mounted on said tank and for actuating means for controlling delivery of pressurized water for either allowing or terminating delivery of pressurized feed water to said cooling coil depending upon the level of the temperature sensed by said sensing element within a predetermined temperature range.

4. The apparatus as recited in claim 3 wherein said means for controlling delivery of pressurized feed water comprises a solenoid-operated water flow control valve for allowing or terminating the flow of pressurized feed water to said cooling coil.

5. The apparatus as recited in claim 3, wherein said temperature sensing element is a thermostat.

6. The apparatus as recited in claim 3, wherein:
said means for generating and supplying pressurized steam includes a boiling tank in which water is converted into steam, and said apparatus further comprises
a water flow conduit located between said boiling tank and said storage tank and connecting said condensing coil at the exterior of said storage tank in flow communication with said boiling tank and means for connecting to a source of electrical power for switching between first and second positions for causing operation of said water delivery controlling means in first and second modes, said switching means in said first position is connected directly to said water delivery controlling means for transmitting electrical power directly thereto and causing operation of said water delivery controlling means in its first mode wherein pressurized feed water is delivered to said cooling and condensing coils and therefrom via said water flow conduit to said boiling tank for initiating either startup filling or flush draining of said boiling tank, said switching means in said second position is connected indirectly to said water delivery controlling means via said temperature sensing means for transmitting electrical power thereto and causing operation of said water delivery controlling means in its second mode wherein pressurized feed water is delivered to said cooling and condensing coils and therefrom via said water flow conduit to said boiling tank for automatically causing replenishment of water as it is needed in said boiling tank.

7. The apparatus as recited in claim 3, wherein: said means for generating and supplying pressurized steam comprises
a boiling tank in which water is converted into steam being disposed above said storage tank, and said apparatus further comprises a water flow conduit means located between said boiling tank and said storage tank and including a main branch connected in flow communication to said condensing coil and a pair of secondary branches connected in flow communication to said main branch one of the pair connected to said boiling tank and the other of the pair to a drain line located above said storage tank, and a flow restrictor interposed in the other of the pair of said secondary branches connected to the drain line so as to insure that there is sufficient head pressure to force the flow of water to said boiling tank.

8. A water distillation apparatus, comprising in combination:

(a) means for generating pressurized steam; and (b) means for condensing the pressurized steam into distilled water, and means for cooling said distilled water said condensing means including a water holding tank which includes (i) a tank body having an annular top rim formed about the top periphery thereof and encompassing a top opening of a cavity defined in said body for holding water therein, (ii) a removable cover for overlying and closing said top opening of said cavity f said tank body and having an annular outer rim formed about the periphery thereof for overlying said annular rim of said body, and (iii) means for removably and sealably attaching said cover at said outer rim thereof on said body at said top rim thereof, said attachment means having a resilient continuous sealing element disposed between said top rim of said body and said outer rim of said cover and releasable fastening elements attached to said rims of said body and cover for imposing a clamping force thereon that draws said rims toward one another and compresses said sealing element between said rims, said sealing element disposed at inner peripheral portions of said respective rims and said fastening element attached at spaced apart locations at outer peripheral portions of said respective rims. wherein said cooling means further including a steam condensing coil connected to said tank cover and disposed in said cavity of said tank body at an upper region thereof above a desired level of distilled water contained therein, and wherein said cooling means including a distilled water cooling coil connected to said condensing coil and disposed in said cavity of said tank body at a lower region thereof below said condensing coil and the desired level of distilled water, said cooling and condensing coils being disposed in said tank body cavity solely by attachment of said condensing coil to said tank cover such that upon removal of said cover from said tank body said coils are removed therewith from said body cavity.

* * * * *

UNITED STATES PATENT AND TRADEMARK OFFICE
CERTIFICATE OF CORRECTION

PATENT NO. : 4,861,435
DATED : August 29, 1989
INVENTOR(S) : Herbert F. Sweet, Jr.

It is certified that error appears in the above-identified patent and that said Letters Patent is hereby corrected as shown below:

Column 12, line 35 (Claim 8, line 13), "f" should be -- of --.

Column 12, line 53 (Claim 8, line 31), the period "." should be a comma -- , --.

Column 12, line 53 (Claim 8, line 31), "cooling" should be -- condensing --.

Signed and Sealed this

Sixteenth Day of October, 1990

Attest:

HARRY F. MANBECK, JR.

*Attesting Officer*              *Commissioner of Patents and Trademarks*